United States Patent
Baris et al.

(10) Patent No.: US 12,245,601 B2
(45) Date of Patent: Mar. 11, 2025

(54) COEXTRUSION HEAD, FOOD PROCESSING MACHINE AND ASSEMBLY METHOD

(71) Applicant: VEMAG Maschinenbau GmbH, Verden (DE)

(72) Inventors: Halis Baris, Doerverden (DE); Peter Knodel, Oyten (DE); Olaf Grote, Eystrup (DE); Malte Regenhardt, Doerverden-Huelsen (DE)

(73) Assignee: VEMAG Maschinenbau GmbH, Verden (DE)

( * ) Notice: Subject to any disclaimer, the term of this patent is extended or adjusted under 35 U.S.C. 154(b) by 48 days.

(21) Appl. No.: 18/447,761

(22) Filed: Aug. 10, 2023

(65) Prior Publication Data

US 2024/0049732 A1   Feb. 15, 2024

(30) Foreign Application Priority Data

Aug. 11, 2022   (DE) .......................... 102022120367.0

(51) Int. Cl.
*A22C 11/00*      (2006.01)
*A22C 11/02*      (2006.01)
*A22C 13/00*      (2006.01)

(52) U.S. Cl.
CPC ...... *A22C 11/0209* (2013.01); *A22C 11/0227* (2013.01); *A22C 2013/0023* (2013.01)

(58) Field of Classification Search
CPC ................ A22C 11/02; A22C 11/0209; A22C 2013/0023; A22C 11/029; A22C 11/10; A22C 13/00; B29C 47/0016; B29C 47/128
USPC ........................ 452/30–32, 35–37, 46–48, 51
See application file for complete search history.

(56) References Cited

U.S. PATENT DOCUMENTS

| | | | |
|---|---|---|---|
| 9,271,507 B2 | 3/2016 | Baris et al. | |
| 2003/0228837 A1* | 12/2003 | Reutter | A22C 13/0003 452/47 |
| 2007/0026777 A1* | 2/2007 | Mueller | A22C 11/0209 452/32 |

(Continued)

FOREIGN PATENT DOCUMENTS

EP    2719284 A1   4/2014

OTHER PUBLICATIONS

European Patent Office; Search Report in related European Patent Application No. EP 23185826 dated Oct. 4, 2023; 5 pages.

*Primary Examiner* — Richard T Price, Jr.
(74) *Attorney, Agent, or Firm* — Wood Herron & Evans LLP

(57) ABSTRACT

A coextrusion head for a food processing machine includes a feed line section having an inner pipe for conducting in the production direction a food mass to be formed into a strand. An inlet end of the inner pipe is connectable to an outlet of a stuffing machine. A housing extends in the production direction from the feed line section and surrounding the inner pipe. A receiving chamber, formed between the inner pipe and the housing, for a casing material to be applied to the strand. The receiving chamber has a housing inlet for the casing material. The feed line section and the housing are integrally embodied and the coextrusion head further includes a die attachment that has a die opening shaped correspondingly to the inner pipe and that is connected to the housing. A food processing machine having a coextrusion head and a corresponding assembly method are disclosed.

20 Claims, 5 Drawing Sheets

(56) References Cited

U.S. PATENT DOCUMENTS

| | | | |
|---|---|---|---|
| 2009/0023373 A1* | 1/2009 | Bachtle | A22C 13/0003 |
| | | | 452/35 |
| 2014/0106653 A1* | 4/2014 | Baris | A22C 11/0209 |
| | | | 452/32 |
| 2015/0208675 A1* | 7/2015 | Baechtle | A22C 11/0263 |
| | | | 452/32 |
| 2021/0212328 A1 | 7/2021 | Knodel et al. | |

\* cited by examiner

COEXTRUSION HEAD, FOOD PROCESSING MACHINE AND ASSEMBLY METHOD

CROSS-REFERENCE TO RELATED APPLICATION

This application claims priority to German Application No. DE 10 2022 120 367.0, filed Aug. 11, 2022, with the same title as listed above. The above-mentioned patent application is incorporated herein by reference in its entirety.

TECHNICAL FIELD

The invention relates to a coextrusion head for a food processing machine, in particular a coextrusion machine for coextruding a food mass and a casing surrounding the food mass, comprising at least one feed line section having an inner pipe for conducting in a production direction a food mass to be formed into a strand, wherein an inlet end of the feed line section is connectable to an outlet of a stuffing machine. Such a coextrusion head also comprises a housing extending in the production direction from the feed line section and surrounding the inner pipe, and a receiving chamber formed between the inner pipe and the housing for a casing material to be applied to the strand, the receiving chamber having a housing inlet for the casing material.

The invention also relates to a food processing machine for producing a strand made of a food mass, and to a method of assembling a coextrusion head.

BACKGROUND

Devices and methods of the aforementioned type are commonly used to produce strings of sausages. In particular, such devices are used to produce strings of sausages having a casing material applied to the outside, preferably substantially continuously. Coextrusion machines can basically also be used to coextrude a wide variety of substances, however.

The food mass, in particular the sausage meat, is generally held in a feed hopper of a first stuffing machine and conveyed toward an outlet using a feed pump for generating a continuous flow of the food mass. Instead of placing the food mass into a casing, for example a synthetic or natural gut casing, it is also possible to apply a free-flowing casing material, that subsequently cures, onto the outside of the food mass. The casing material protects the food mass, also in terms of hygiene, and gives the strand produced from the food mass greater strength, so that breaking the strand inadvertently is made more difficult or prevented. Collagen or alginate, for example, is used as a casing material for application to the surface of the strand produced. Collagen and alginate are free-flowing casing materials that cure a relatively short period of time after being applied to the strand surface and that form a firm casing on the strand. The casing material is usually held in a feed hopper of a second stuffing machine and conveyed toward an outlet of the second stuffing machine using a feed pump for generating a continuous flow of the food mass. In most cases, the outlet of the first stuffing machine and the outlet of the second stuffing machine are in fluid communication with a coextrusion head.

EP 2 719 284 A1 shows such an extrusion head. An inlet end of a feed line is connected to the outlet of the first stuffing machine, and an inlet opening of a housing of the coextrusion head is connected to the outlet of the second stuffing machine for feeding in the alginate. The feed line is screwed into the housing and an inner pipe of the feed line extends at least in sections through the housing. A receiving chamber, into which the inlet opening of the housing opens, is formed between an inner wall of the housing and the inner pipe. The housing also has an outlet opening that surrounds an outlet end of the inner pipe and the diameter of which is greater than the outlet diameter of the feed line. Due to the gap thus formed, the casing material received in the receiving chamber can exit the latter and is applied to the food mass conveyed through the feed line. For that purpose, the inner pipe of the feed line has a reduced wall thickness on the outlet side, such that the casing material may firstly be conveyed along the outside of the inner pipe at a small distance from the conveyed food mass and can subsequently be applied to the food mass. Due to the low thickness of the wall in the outlet region, the feed line is susceptible to deformation and warping. The feed line must also be separated from the housing for cleaning purposes and in that state is no longer protected by the surrounding housing. In this state, especially, there is a high risk of the feed line being damaged and deformed. Furthermore, when connecting supply lines to the housing inlet, the feed line may warp relative to the housing, which may then result in a nonuniform gap between the feed line and the housing.

This is addressed by the invention, the object of which is to overcome at least one of the disadvantages known from the prior art. More particularly, the object of the present invention is to provide a more robust food processing machine, a more robust coextrusion head for a food processing machine, which is easier to clean, and a method of assembling a coextrusion head.

SUMMARY

A first embodiment achieves the object specified above by using a coextrusion head according to claim 1.

The first embodiment proposes that the housing and the feed line section are integrally embodied. The first embodiment also proposes that the coextrusion head further comprises a die attachment that has a die opening shaped correspondingly to the inner pipe and that is connected to the housing, in particular to a distal end of the housing. In other words, the first embodiment proposes that the housing and the feed line section, including the inner pipe, are designed as one piece, with a die attachment being connected as a separate component to the housing. This means that the inner pipe no longer needs to be separated from the housing for cleaning purposes, so the inner pipe is still surrounded and thus protected by the housing even when it is being cleaned. The integral component that combines the inner pipe and the housing is thus significantly more robust and can be easily handled and cleaned. Due to the die plate being variably connectable to the housing, it is also possible for different die attachments with an inner pipe to be used.

The production direction refers here to the direction of the food mass from the first stuffing machine through the feed line section, including the inner pipe, and finally also through any downstream curing device. It thus refers to the path of the food mass and later of the strand. In the region of the coextrusion head, this is the same as an axial direction along which the coextrusion head, in particular the housing and the feed line section, extend.

Coextrusion as used herein means the bringing together of different substances, in particular at least one food mass and casing material, to form a product, in particular a food product. The substances are held in two or more stuffing machines, or the like, and are brought together in a coextrusion device or coextrusion head.

The die opening of the coextrusion head according to the first embodiment may extend at such a distance from the inner pipe that a gap surrounding the inner pipe is formed for dispensing casing material. The casing material can exit the receiving chamber radially outside the inner pipe through the gap formed between the inner pipe and the die opening and is thus applied directly to the exiting strand. With the die plate designed as a separate component, an integral component comprising the housing and the feed line section may be used with different die attachments to produce strands having casing material of different thicknesses. The gap is formed between the die opening and the inner pipe in a plane that is orthogonal to the production direction and is designed for the passage of casing material.

The gap may be uniform and may have a gap width in a range from 0.1 mm to 1 mm. The gap width depends in particular on the viscosity of the casing material to be applied.

According to one embodiment, the gap has a width that varies in the production direction and reaches a minimum at the distal outlet end of the inner pipe. Thus, to insert it into the die opening, the inner pipe can firstly be inserted through an enlarged die opening, wherein a gap with a small gap width may be formed at the outlet end.

The die opening may be designed to receive at least an outlet end of the inner pipe. The inner pipe is thus guided and supported by the die opening. The inner pipe is thus protected against shocks and impacts caused by the die plate.

The inner pipe, in particular a flow channel formed in the inner pipe, may have a constant flow cross-section in the region of the die opening and tapers in the production direction. In other words, the wall thickness of the inner pipe decreases toward the outlet, while the flow cross-section remains constant. The reduction in the wall thickness of the inner pipe in the production direction reduces the distance at the outlet between the strand that is conveyed through the inner pipe and the casing material that is fed through the gap along the outside of the inner pipe. The flow of the casing material along the outside of the inner pipe is additionally supported by the tapered shape of the inner pipe.

The die opening may be funnel-shaped in the production direction. It should be understood that the narrower end of the funnel-shaped die opening points in the production direction, and the wider end of the funnel-shaped die opening points in the opposite direction to the production direction. For assembly, the inner pipe is thus fitted into the die opening on the side with the larger die opening cross-section and guided into the final position. Due to the funnel shape, the casing material can flow more easily along the inner pipe through the die opening. The initially larger cross-section of the funnel-shaped die opening also makes it easier to place the die plates onto the inner pipe and reduces the risk of damage to the inner pipe.

The die attachment may be connected to the housing by a form-fitting and/or force-fitting connection. Form-fitting and/or force-fitting connections may be designed as releasable connections, thus allowing easy disassembly of the die attachment.

The die attachment may be connected to the housing by at least one of the following connections: a clamp connection, a bayonet connection or a screw connection. If the inner pipe is cylindrical in shape, the housing with the inner pipe can thus be connected by a bayonet connection or a screw connection, for example. In general, furthermore, using a clamp connection or snap-fit connection also allows the use of different inner pipe geometries, for example with square or triangular flow cross-sections.

Preferably, the housing has a first mating surface and the die attachment has a second mating surface, the die attachment being connected to the housing by a mating fit. The mating fit may be cylindrical or cone-shaped. A mating fit ensures a releasable connection between the die attachment and the housing. This simultaneously prevents any unintentional leakage of casing material due to excessive tolerances between the die attachment and the housing.

The coextrusion head may also have a seal, in particular a sealing ring, disposed between the housing and the die attachment. This reliably prevents any unintentional escape of casing material.

The feed line section and the housing may be manufactured in a casting process. A casting process expediently may allow a metallic integral housing with a feed line section to be manufactured, including an inner pipe disposed inside the housing. Alternatively, the feed line section may be welded to the housing.

According to another embodiment, the housing terminates in the production direction with the outlet end of the inner pipe. At least a part of the housing may protrude in the production direction in relation to the distal end of the inner pipe. The inner pipe is thus protected completely by the housing against forces acting transversely to the production direction. The housing also protects the inner pipe against falls, in which forces act on the coextrusion head in the opposite direction to the production direction.

The housing may be shaped correspondingly to the inner pipe and extends parallel to the inner pipe in the production direction. The housing may have a substantially cylindrical shape.

The die attachment may have an orifice surface that surrounds the die opening and is recessed relative to the production direction. The distal outlet end of the inner pipe may protrude in the production direction relative to the orifice surface. The food mass exiting the inner pipe expands initially in a direction transverse to the production direction, which means the food mass swells. Due to the inner pipe protruding in the production direction, the expanding food mass does not prevent the application of the casing material, in particular through the gap formed around the inner pipe. The casing material may thus flow out of the receiving chamber and along the outside of the inner pipe to meet the expanding food mass. Because it expands, the food mass entrains the casing material outwards in the direction of expansion and forwards in the production direction, such that a uniform casing forms on the food mass. In the assembled state, the inner pipe is reliably protected, also in the protruding region, by the orifice surface that is recessed relative to the production direction and the remainder of the die attachment.

The feed line section may have a flow channel with an enlarged flow cross-section on the inlet side, which decreases in the production direction. On the outlet side, the inner pipe also has a flow channel with a constant flow cross-section, which opens into the outlet end of the inner pipe. A compression insert may be arranged between the flow channel with the constant flow cross-section and the flow channel with the decreasing flow cross-section. The compression insert is configured to reduce the flow cross-section in certain regions so that a greater pressure is exerted on the food mass and the latter is compacted.

The receiving chamber may have a vent hole, which in the assembled state of the extrusion head may be arranged above the housing inlet, in particular in the vertical direction. The casing material flowing through the inlet therefore rises slowly in the receiving chamber and displaces the air contained therein, which can escape through the vent hole, thus ensuring that the casing material is applied uniformly and without any air being trapped.

A second embodiment relates to a food processing machine, in particular a coextrusion machine for producing a strand made of a food mass. The food processing machine comprises a first stuffing machine having a first feed hopper for receiving the food mass, a first feed pump for conveying the food mass and a first outlet for discharging the food mass, The food processing machine further comprises a second stuffing machine having a second feed hopper for receiving the food mass, a second feed pump for conveying the food mass and a second outlet for discharging the food mass. The food processing machine also comprises a coextrusion head connected to the first outlet and the second outlet. The second embodiment achieves the object specified above by the coextrusion head being designed according to the first embodiment of the invention.

The food processing machine may also comprise at least one curing device for curing the casing material applied to the strand. Such a curing device may be arranged adjacent the outlet end of the inner pipe. Such a curing device may comprise one or more spray heads for spraying on a curing material, such as calcium chloride, for curing the casing material. Such a curing device may include a receiving device for receiving excess curing material, and a spout for discharging the latter.

A third embodiment relates to a method of assembling a coextrusion head, in particular a coextrusion head according to the first embodiment of the invention. The method achieves the object specified above by comprising the steps of: providing at least one feed line section having an inner pipe for conducting in a production direction the food mass to be formed into a strand, wherein an inlet end of the inner pipe is connectable to an outlet of a stuffing machine, and a housing extending in the production direction from the feed line section and surrounding the inner pipe, wherein a receiving chamber for a casing material to be applied to the strand is formed between the inner pipe and the housing, the receiving chamber having a housing inlet for the casing material, wherein the feed line section and the housing are integrally embodied; connecting a distal end of the housing to a die attachment having a die opening shaped correspondingly to the inner pipe, in order to seal the receiving chamber.

By providing a feed line section integrally embodied with a housing and having an inner pipe, a receiving chamber formed between the inner pipe and the housing, and a die attachment for connecting to a distal end of the housing, the latter utilizes the advantages described above with reference to the first embodiment.

BRIEF DESCRIPTION OF THE DRAWINGS

The invention shall now be described in greater detail with reference to one or more embodiments and the attached Figures, in which.

DETAILED DESCRIPTION

Figure 1:
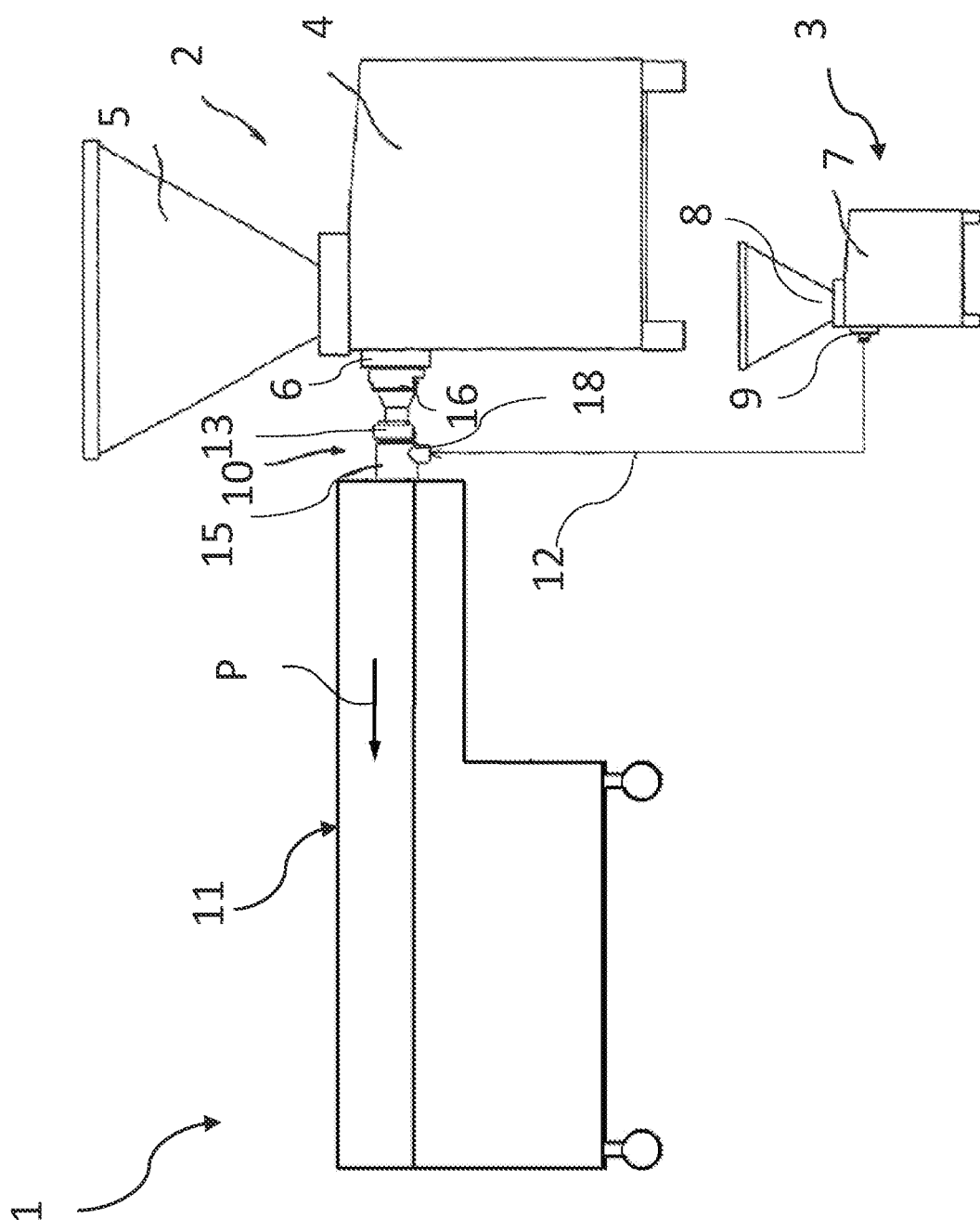
FIG. 1: shows a perspective view of a food processing machine for producing a strand made of a food mass, having a coextrusion head according to an embodiment of the invention, and a device for further processing.

FIG. 1 shows a food processing machine 1 for producing a strand made of a food mass such as sausage meat or the like, which is encased in a casing material. Food processing machine 1 is a coextrusion machine and comprises a first stuffing machine 2 and a second stuffing machine 3. The first stuffing machine 2 comprises a first feed pump 4, the position of which is merely suggested in the view shown, and a first feed hopper 5. Food processing machine 1 further comprises a second stuffing machine 3 having a second feed hopper 8 and a second feed pump 7, the position of which is likewise merely suggested. The first stuffing machine 2 has a first outlet 6, and the second stuffing machine 3 has a second outlet 9.

Food processing machine 1 also has a coextrusion head 10 which is connected to the first outlet 6 and which is also connected to second outlet 9 via a conduit 12. Depending on the spatial arrangement of the first and second stuffing machine 2, 3, a conduit of any length may be used to connect the first stuffing machine and the second stuffing machine 2, 3.

A curing device 11 is arranged downstream from coextrusion head 10 in production direction P. Curing device 11 is designed to cure casing material applied to the food strand. For that purpose, curing device 11 may have one or more spray heads for dispensing a curing material such as calcium carbonate. Other devices, such as separator or twist-linking devices, may also be arranged downstream from the curing device in production direction P.

Coextrusion head 10 has a feed line section 13 and a housing 15. Feed line section 13 is connected to outlet 6 of the first stuffing machine 2 via an inlet end 16. Housing 15 also has a housing inlet 18, which is connected to the second outlet 9 via conduit 12. The food mass from the first stuffing machine 2 is conveyed in a production direction P by coextrusion head 10 and is encased on the outlet side in a casing material from the second stuffing machine 3.

Coextrusion head 10 is shown in detail in FIGS. 2 to 5. As already described with reference to FIG. 1, coextrusion head 10 has feed line section 13 and housing 15. Feed line section 13 and housing 15 are integrally embodied.

Figure 3:
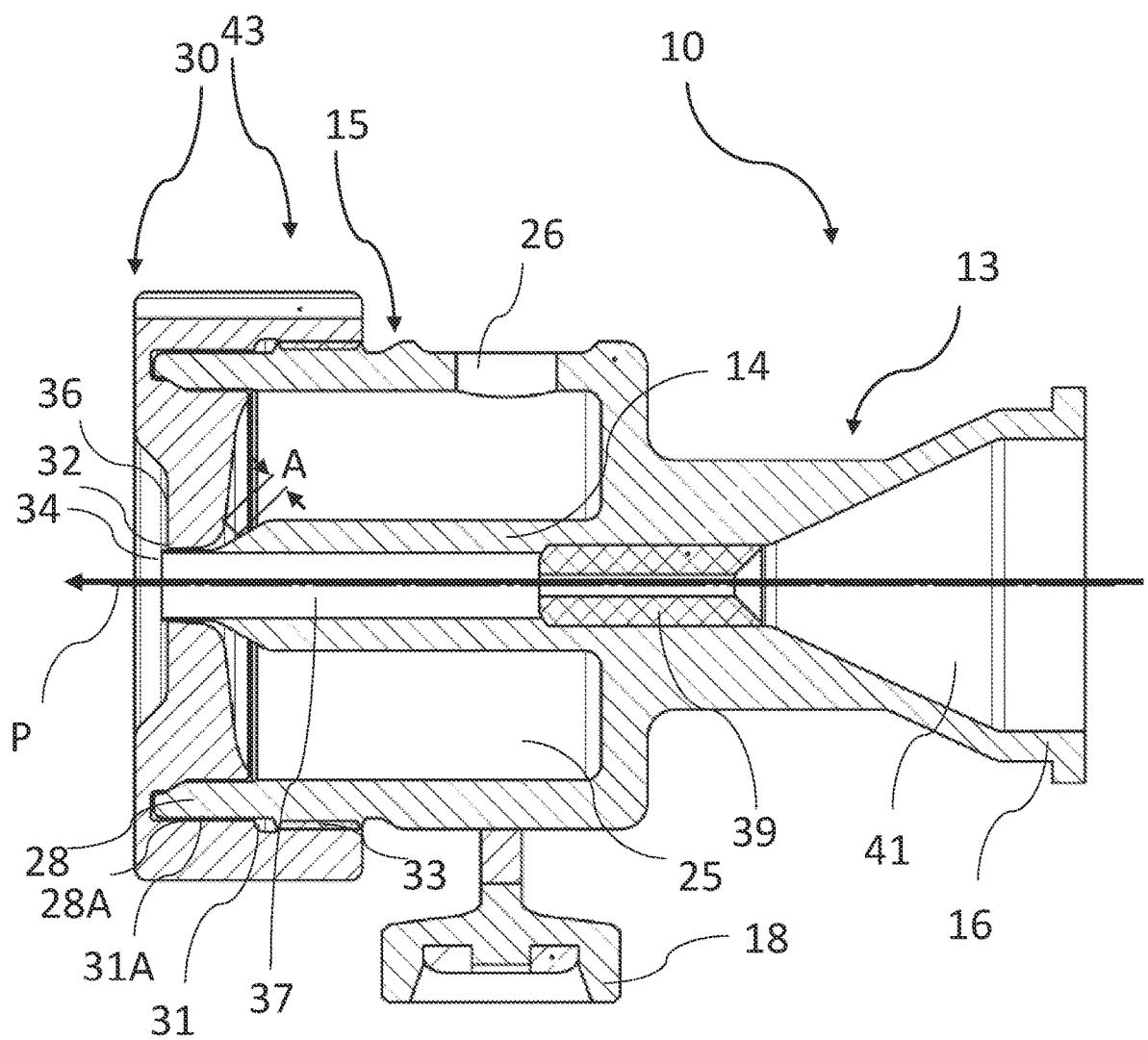
FIG. 3 shows a cross-sectional side view of the coextrusion head shown in FIG. 1.
Figure 4:
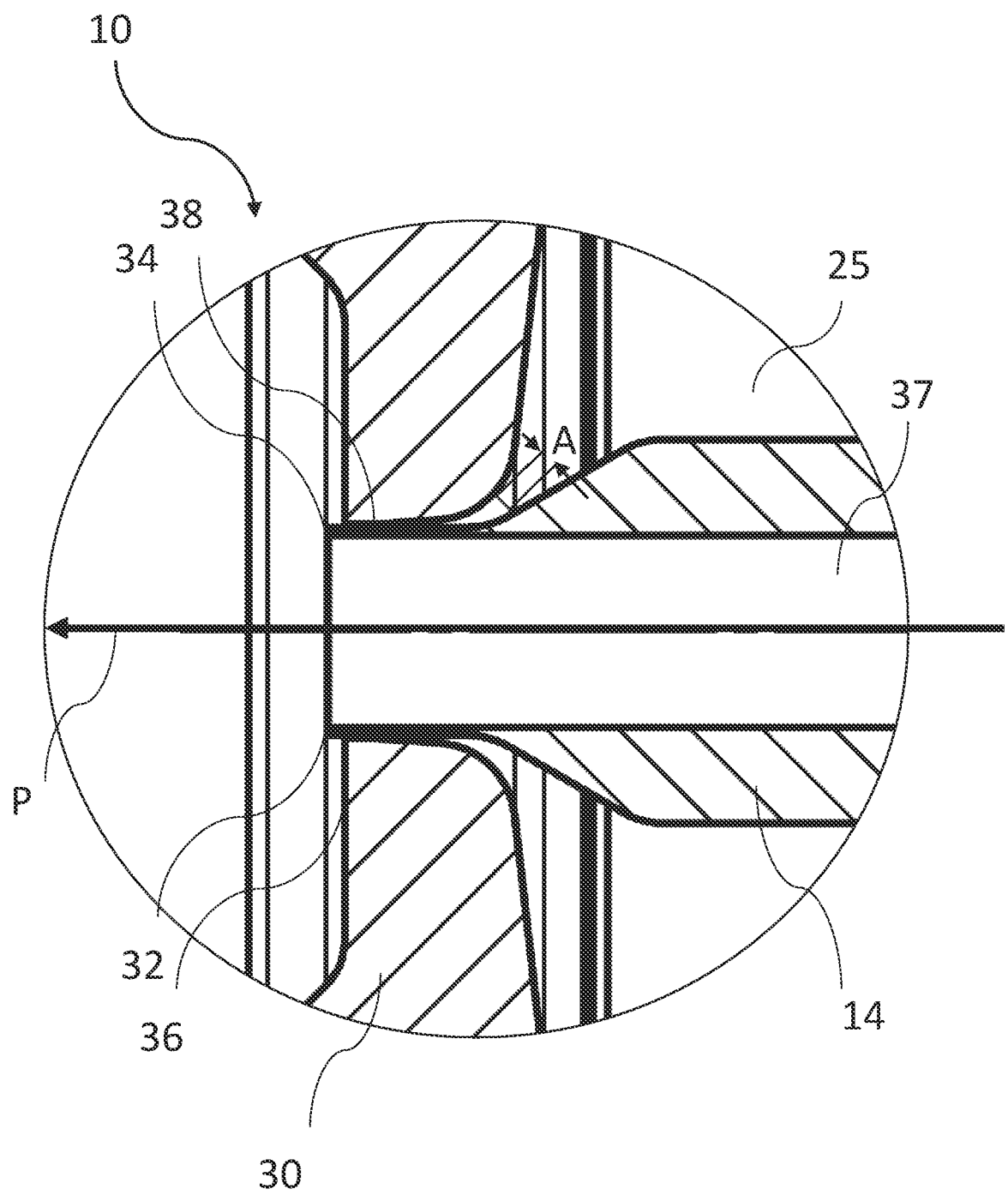
FIG. 4 shows a detail of the side view of the coextrusion head in FIG. 3.

As shown in FIG. 3, feed line section 13 has an inner pipe 14, and a receiving chamber 25 is formed between inner pipe 14 and an inner wall 27 of housing 15. Housing 15 has the housing inlet 18 for feeding casing material into receiving chamber 25, and a vent hole 26. In the assembled state of extrusion head 10, vent hole 26 is arranged above housing inlet 18 in the vertical direction. The casing material fed in through housing inlet 18 therefore rises initially in receiving chamber 25 and displaces the air contained therein, which can escape via vent hole 26.

Coextrusion head 10 further comprises a die attachment 30 with an opening 32 for discharging casing material. Die attachment 30 is connected to a distal end 28 of housing 15. Die attachment 30 has a receiving opening 31 shaped correspondingly to the distal end 28 of housing 15. Housing 15 and die attachment 30 may be connected to each other in a mating fit 43. The distal end 28 of housing 15 has a first mating surface 28A and die attachment 30 has a corresponding second mating surface 31A inside receiving opening 31. As can be seen in FIG. 3, housing 15 and die attachment 30 are connected to each other via a screw connection 33.

Figure 2:
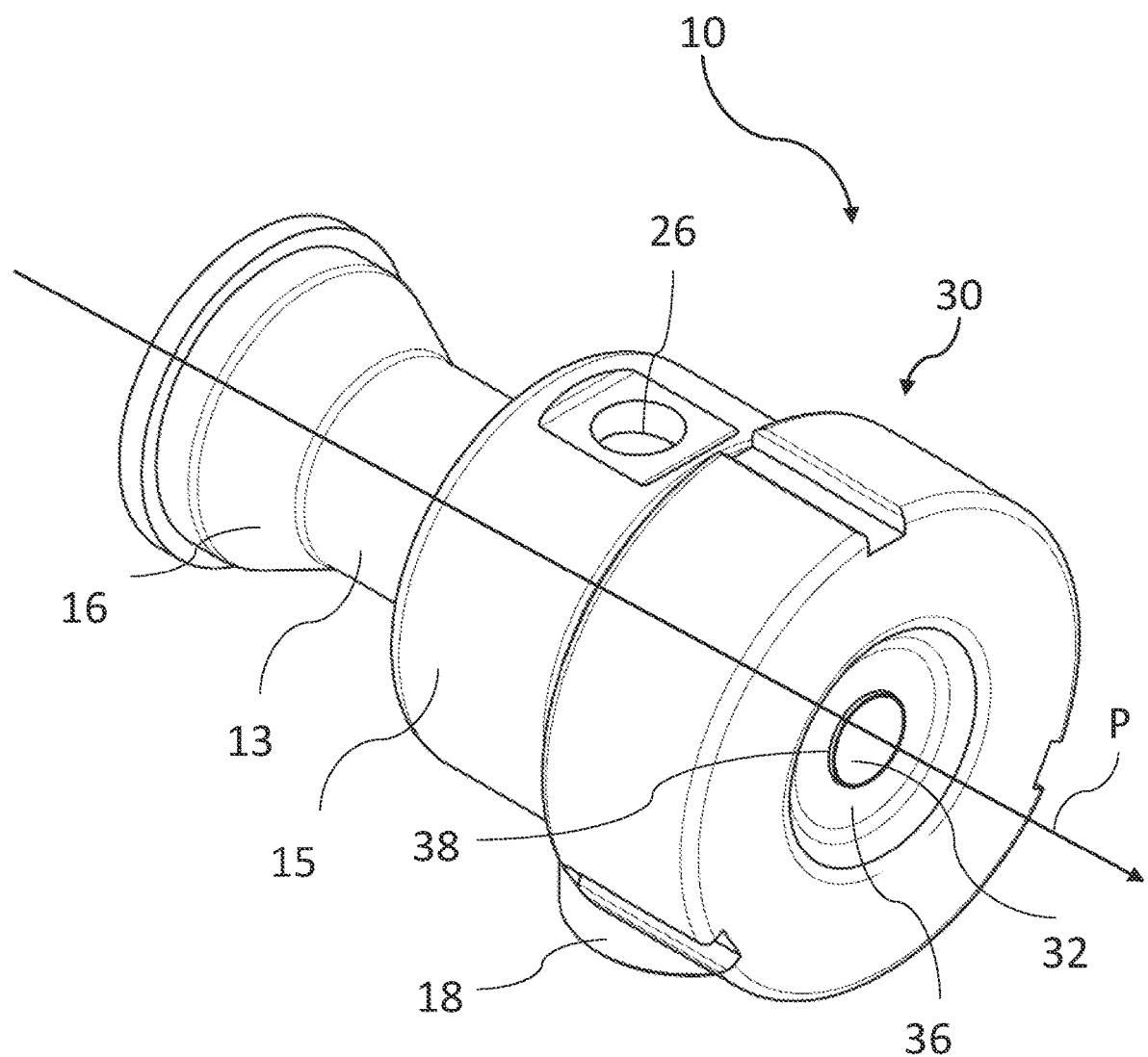
FIG. 2: shows a perspective view of the coextrusion head according to an embodiment of the invention.

In the region of inner pipe 14, feed line section 13 has a flow channel 37 with a constant cross-section. Inner pipe 14 also has a distal outlet end 34, and the wall thickness of inner pipe 14 decreases toward outlet end 34, i.e., in production direction P. As shown in FIG. 2, inner pipe 14 tapers in production direction P in a region adjacent attachment 30. Casing material from receiving chamber 25 can thus flow along the gradually tapering inner pipe 14 toward outlet end 34.

Feed line section 13 also has an inlet end 16, in which flow channel 41 has an enlarged flow cross-section. Starting from the inlet end, the flow cross-section decreases in production direction P. According to an embodiment, a compression insert 39 is arranged between the region of flow channel 41 with the enlarged cross-section and the region of flow channel 37 with the constant flow cross-section. The section of flow channel 41 with an enlarged cross-section tapers toward compression insert 39. Compression insert 39 is configured to compress the food mass and to increase the pressure on the food mass in the region of inner pipe 14, i.e., substantially in the region of flow channel 37 with a constant flow cross-section.

As shown in FIGS. 3 and 2, the distal outlet end 34 of inner pipe 14 protrudes in production direction P relative to an orifice surface 36 of die attachment 30. Due to the protruding outlet end 34, the casing material can exit receiving chamber 25 unobstructed through a gap 38 formed between opening 32 and inner pipe 14.

Figure 5:
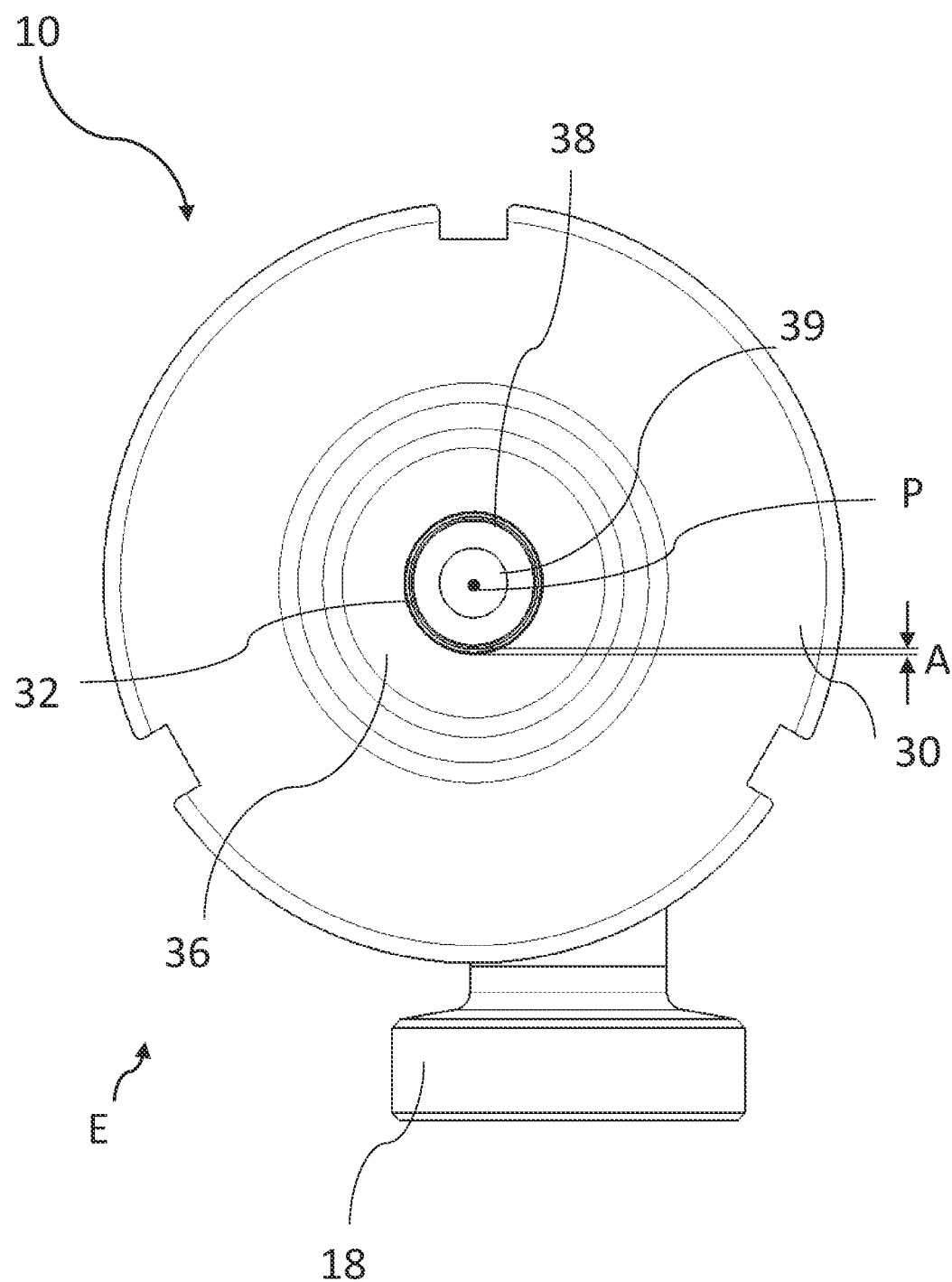
FIG. 5 shows a front view of the coextrusion head shown in FIG. 1.

In FIG. 5, gap 38 is shown in a plane E orthogonal to production direction P. In the view shown there, gap 38 extends with a uniform gap width A around inner pipe 14. As can also be seen in the detail shown view in FIG. 4, the gap width A varies in production direction P and reaches a minimum at the outlet end. The relatively larger gap width A on the side of receiving chamber 25 allows the casing material to flow easily into gap 38. Reducing gap width A to the minimum reached at the outlet allows the casing material to be dispensed with a minimum thickness of 0.1 mm to 1 mm.

To assemble extrusion head 10, feed line section 13 with inner pipe 14 is first provided. Housing 15 extending in production direction P and surrounding inner pipe 14 is also provided, wherein housing 15 extends from feed line section 13 in production direction P and is integrally embodied with the latter. A distal end 28 of housing 15—i.e., the outlet end section—is then connected to die attachment 30 in order to seal receiving chamber 25.

The connection may be a form-fitting or force-fitting connection. In the embodiment shown in FIGS. 2 to 5, the connection is a force-fitting connection, namely a screw connection 33 and a mating fit 43.

In the embodiment shown, inner pipe 14 and die opening 32 have a round cross-section. However, different cross-sections are also possible and envisaged within the scope of the invention.

The embodiments described above are descriptions of one or more embodiments of the present invention, and do not intend to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCE SIGNS

1 Food processing machine
2 First stuffing machine
3 Second stuffing machine
4 First feed pump
5 First feed hopper
6 First outlet
7 Second feed pump
8 Second feed hopper
9 Second outlet
10 Coextrusion head
11 Curing device
12 Conduit
13 Feed line section
14 Inner pipe
15 Housing
16 Inlet end
18 Housing inlet
25 Receiving chamber
26 Vent hole
27 Inner wall
28 Distal end
28A First mating surface
30 Die attachment
31 Receiving opening
31A Second mating surface of the die attachment
32 Die opening
33 Connection, screw connection
34 Outlet end
36 Orifice surface
37 Flow channel
38 Gap
39 Compression insert
41 Flow channel
43 Mating fit
P Production direction
A Gap width
E Plane

What is claimed is:

1. A coextrusion head for a food processing machine for coextruding a food mass and a casing surrounding the food mass, comprising:
at least one feed line section having an inner pipe for conducting in a production direction the food mass to be formed into a strand, wherein an inlet end of the inner pipe is connectable to an outlet of a stuffing machine;
a housing extending in the production direction from the feed line section and surrounding the inner pipe; and
a receiving chamber, formed between the inner pipe and the housing, for a casing material to be applied to the strand, said receiving chamber having a housing inlet for the casing material,
wherein the feed line section and the housing are integrally embodied and the coextrusion head further comprises a die attachment that has a die opening shaped correspondingly to the inner pipe and that is connected to the housing.

2. The coextrusion head according to claim 1, wherein the die opening is shaped correspondingly to the inner pipe in such a way that a gap for the passage of casing material is formed between the die opening and the inner pipe in a plane orthogonal to the production direction.

3. The coextrusion head according to claim 2, wherein the inner pipe has a constant flow cross-section in the region of the die opening and the inner pipe tapers in the production direction.

4. The coextrusion head according to claim 2, wherein the gap is uniform and has a gap width in a range from 0.1 mm to 1 mm.

5. The coextrusion head according to claim 1, wherein the die opening is designed to receive at least an outlet end of the inner pipe.

6. The coextrusion head according to claim 5, wherein the gap has a width that varies in the production direction and reaches a minimum at the distal outlet end of the inner pipe.

7. The coextrusion head according to claim 5, wherein the housing terminates in the production direction with the outlet end of the inner pipe.

8. The coextrusion head according to claim 5, wherein the housing protrudes in the production direction in relation to the outlet end of the inner pipe.

9. The coextrusion head according to claim 5, wherein the die attachment has an orifice surface that is recessed relative to the production direction and which surrounds the die opening, and
wherein the distal outlet end of the inner pipe protrudes in the production direction in relation to the orifice surface.

10. The coextrusion head according to claim 1, wherein the die opening is funnel-shaped in the production direction.

11. The coextrusion head according to claim 1, wherein the die attachment is connected to the housing by at least one of the following connections: a releasable form-fitting connection or a releasable force-fitting connection.

12. The coextrusion head according to claim 1, wherein the die attachment is connected to the housing by at least one of the following connections: a clamp connection, a bayonet connection, or a screw connection.

13. The coextrusion head according to claim 1, wherein the housing has a first mating surface and the die attachment has a second mating surface and the die attachment is connected to the housing by a mating fit.

14. The coextrusion head according to claim 13, wherein the mating fit is cylindrical in shape.

15. The coextrusion head according to claim 14, wherein the mating fit is cone-shaped.

16. The coextrusion head according to claim 1, wherein the feed line section and the housing are manufactured in a casting process.

17. The coextrusion head according to claim 1, wherein the receiving chamber has a vent hole which in the assembled state of the coextrusion head is arranged above the housing inlet.

18. A method of assembling a coextrusion head according to claim 1, the method comprising:
providing at least one feed line section having an inner pipe for conducting in a production direction the food mass to be formed into a strand, and a housing extending in the production direction from the feed line section and surrounding the inner pipe, wherein the feed line section and the housing are integrally embodied, and wherein a receiving chamber for a casing material to be applied to the strand is formed between the inner pipe and the housing, said receiving chamber having a housing inlet for the casing material; and
connecting a distal end of the housing to a die attachment having a die opening shaped correspondingly to the inner pipe, in order to seal the receiving chamber.

19. A food processing machine for producing a strand made of a food mass, comprising:
a first stuffing machine having a first feed hopper for receiving the food mass, a first feed pump for conveying the food mass and a first outlet for discharging the food mass,
a second stuffing machine having a second feed hopper for receiving the food mass, a second feed pump for conveying the food mass and a second outlet for discharging the food mass,
a coextrusion head connected to the first outlet and the second outlet,
wherein the coextrusion head is according to claim 1.

20. The food processing machine according to claim 19, further comprising:
at least one curing device for curing the casing material applied to the strand.

* * * * *